(12) United States Patent
Okamoto et al.

(10) Patent No.: US 8,006,890 B2
(45) Date of Patent: Aug. 30, 2011

(54) FRICTION STIR PROCESSING APPARATUS WITH A VIBRATOR

(75) Inventors: Kazutaka Okamoto, Tokai (JP); Seung Hwan Park, Mito (JP); Satoshi Hirano, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 12/389,602

(22) Filed: Feb. 20, 2009

(65) Prior Publication Data

US 2009/0152328 A1    Jun. 18, 2009

(30) Foreign Application Priority Data

Dec. 13, 2007    (JP) .................... 2007-321762

(51) Int. Cl.
B23K 20/12    (2006.01)
B23K 5/00    (2006.01)
B23K 37/02    (2006.01)
(52) U.S. Cl. .................. 228/2.1; 228/33; 228/45
(58) Field of Classification Search ................ 228/2.1, 228/112.1
See application file for complete search history.

(56) References Cited

U.S. PATENT DOCUMENTS

| | | | | |
|---|---|---|---|---|
| 5,697,544 A * | 12/1997 | Wykes | | 228/2.1 |
| 5,971,247 A * | 10/1999 | Gentry | | 228/2.1 |
| 6,247,633 B1 * | 6/2001 | White et al. | | 228/112.1 |
| 6,264,088 B1 * | 7/2001 | Larsson | | 228/2.1 |
| 6,450,395 B1 * | 9/2002 | Weeks et al. | | 228/112.1 |
| 6,607,119 B2 * | 8/2003 | Engelhard et al. | | 228/112.1 |
| 6,857,555 B2 * | 2/2005 | Ishida et al. | | 228/112.1 |
| 6,866,181 B2 * | 3/2005 | Aota et al. | | 228/112.1 |
| 7,568,608 B1 * | 8/2009 | Ding | | 228/110.1 |
| 2002/0190101 A1 * | 12/2002 | Nelson et al. | | 228/112.1 |
| 2004/0079787 A1 * | 4/2004 | Okamoto et al. | | 228/112.1 |
| 2007/0119906 A1 * | 5/2007 | Mika | | 228/112.1 |
| 2008/0308236 A1 * | 12/2008 | Chen et al. | | 156/514 |
| 2009/0090700 A1 * | 4/2009 | Sato et al. | | 219/117.1 |

FOREIGN PATENT DOCUMENTS

| | | |
|---|---|---|
| JP | 07-505090 | 6/1995 |
| JP | 10-183316 | 7/1998 |
| JP | 11320128 A * | 11/1999 |
| JP | 2000-042762 | 2/2000 |
| JP | 3229556 | 9/2001 |

(Continued)

*Primary Examiner* — Kiley Stoner
*Assistant Examiner* — Carlos Gamino
(74) *Attorney, Agent, or Firm* — Antonelli, Terry, Stout & Kraus, LLP.

(57) ABSTRACT

An apparatus for a friction stir and a friction stir processing of the present invention suppress an occurrence of a surface defect in an area processed by the friction stir. The apparatus for the friction stir includes a tool having a columnar tip-side part, a rotating unit for rotating the tool on a central axis, a first pressing unit for pressing a tip of the tool rotated by the rotating unit against a work, a jig having a tool insertion hole into which the tip-side part of the tool is inserted so that the tip-side part of the tool is encircled around the jig, a second pressing unit for slidably pressing the jig against the work, and a press control unit for controlling the first pressing unit so that the tip-side part of the tool is gradually pulled out of the work by the first pressing unit while moving the tool and the jig relative to the work, in a state that the tool is rotated by the rotating unit and the tip of the tool has been sunk into the work to a predetermined depth by the first pressing unit.

16 Claims, 10 Drawing Sheets

FOREIGN PATENT DOCUMENTS

| | | |
|---|---|---|
| JP | 3295376 | 4/2002 |
| JP | 3346380 | 9/2002 |
| JP | 2007-064129 | 3/2007 |
| JP | 2007-100129 | 4/2007 |
| WO | WO 93/10935 | 6/1993 |
| WO | WO 02/24382 A1 | 3/2002 |
| WO | WO 2007132252 A1 * | 11/2007 |

* cited by examiner

WITH VIBRATION

WITHOUT VIBRATION

CROSS-SECTION PHOTO

STRUCTURE OBTAINED
BY FRICTION STIR

STRUCTURE OBTAINED
BY ARC WELDING

FRICTION STIR PROCESSING APPARATUS WITH A VIBRATOR

BACKGROUND OF THE INVENTION

1. Field of the Invention

The present invention relates to an apparatus for a friction stir and a friction stir processing.

2. Description of Related Art

As a method for butt joining members, a friction stir welding (FSW) method is known. (Refer to Document 1 (Published Japanese Translation of PCT Application No. Hei 07-505090), for example.) The members are joined together in solid state by pressing a rotating tool against a seam so that frictional heat produced between the tool and the members is utilized to soften the members in proximity to the tool; and the tool is rotated and moved along the seam between the members. One application of the friction stir welding, is modification treatments using the friction stir welding process, including the modification of an aluminum cast, and the development of super plasticity by microstructure refining of wrought aluminum, composition carried out by dispersing another substance, such as powder, into a member, and the like. (Refer to Document 2 (Japanese Patent No. 3229556), Document 3 (Japanese Patent No. 3346380), and Document 4 (Japanese Patent Laid-open No. 2007-100129), for example.)

An example of the application of modification processing utilizing a friction stir is modification processing in proximity to a ring groove for a piston ring in a cylindrical piston used in internal combustion engines, such as gasoline engines. For the pistons of gasoline engines and the like, a cast of aluminum, aluminum alloy, or magnesium alloy (hereafter, referred to as "aluminum cast or the like") is widely used. The pistons are provided on the circumferential surface thereof with a groove for fitting the piston ring and the surface of this groove is subjected to alumite treatment (anodic coating for aluminum and aluminum alloy) for ensuring wear resistance.

The smoothness of an alumite layer (coating) formed by alumite treatment is an important parameter that determines the sealability of the piston ring. In the case of the groove for fitting the piston ring, for example, an alumite layer inferior in smoothness causes compressed gas to escape from the combustion chamber to the crankcase, that is, it causes so-called blow-by. To cope with this, the following measure is taken: the area where this alumite layer is to be formed is modified by the friction stir to homogenize the metal structure of the substrate and then alumite treatment is carried out.

However, joining and modification by a conventional friction stir involves problems. The substance to be process stirred by the tool is discharged by rotation of the tool, and a groove-like defect is produced in a joint or a modified area as if it were subjected to cutting work. In addition, when the rotating tool is pulled out of an aluminum cast or the like after the completion of joining or modification by the friction stir, a concave, designated as so-called key hole, in line with the shape of the tip of the tool can be produced. In case of the above-mentioned piston ring, there is a possibility that the blow-by will be caused by this key hole.

As one of methods for solving the above problems, the following technology has been proposed: in an aluminum cast or the like as the substrate, an area where the ring groove is to be formed is modified by the friction stir to form a homogenized metal structure; and thereafter, the ring groove is formed by machining and then alumite treatment is subjected to the area. (Refer to Document 5 (Japanese Patent Laid-open No. 2007-64129), for example). In the technology disclosed in Document 5, because the ring groove is formed by machining after a friction stir processing, any groove-like defect and key hole formed on the surface of the modified area during the machining is removed.

However, this technology also involves a problem. To completely eliminate key holes from the ring groove by machining, an outside diameter of a tool used in the friction stir must be larger than the groove width of the ring groove. Under these conditions, it is difficult to secure sufficient width and depth of a modified area. In addition, it is required to use a tool of small diameter and this shortens the life of the tool. To ensure a large width of a modified area without regard for the width of the ring groove, the following method can be used: a dolly block is attached to a piston; and the friction stir processing is completed with this dolly block and then the dolly block is removed from the piston. (Refer to Document 6 (Japanese Patent No. 3295376), for example.) In this method, the dolly block must be prepared for each piston and this increases the production cost.

The present invention has been made with the above situation taken into account. It is an object of the present invention to provide an apparatus for a friction stir and a friction stir processing wherein the occurrence of a surface defect in an area processed by the friction stir can be suppressed.

SUMMARY OF THE INVENTION

An apparatus for a friction stir according to a first aspect of the present invention includes a tool having a columnar tip-side part, a rotating unit for rotating the tool on a central axis, a first pressing unit for pressing a tip of the tool rotated by the rotating unit against a work, a jig having a tool insertion hole into which the tip-side part of the tool is inserted so that the tip-side part of the tool is encircled around the jig, a second pressing unit for slidably pressing the jig against the work, and a press control unit for controlling the first pressing unit so that the tip-side part of the tool is gradually pulled out of the work by the first pressing unit while moving the tool and the jig relative to the work, in a state that the tool is rotated by the rotating unit and the tip of the tool has been sunk into the work to a predetermined depth by the first pressing unit.

An apparatus for a friction stir according to a second aspect of the present invention includes a tool having a columnar tip-side part, a rotating unit for rotating the tool on the central axis, a first pressing unit for pressing a tip of the tool against a work, a jig for retaining the work, a second pressing unit for slidably pressing the jig against the work a vibrator for applying mechanical vibration to the jig in a direction of pressing the jig, and a vibration control unit for actuating the vibrator at least when the tool is rotated by the rotating unit, the tip of the tool has been sunk into the work to the predetermined depth by the first pressing unit, and the tool and the jig and the work are moved relative to the work.

According to the present invention, it is possible to suppress an occurrence of a surface defect in an area processed by the friction stir.

DETAILED DESCRIPTION OF THE PREFERRED EMBODIMENTS

Figure 1:
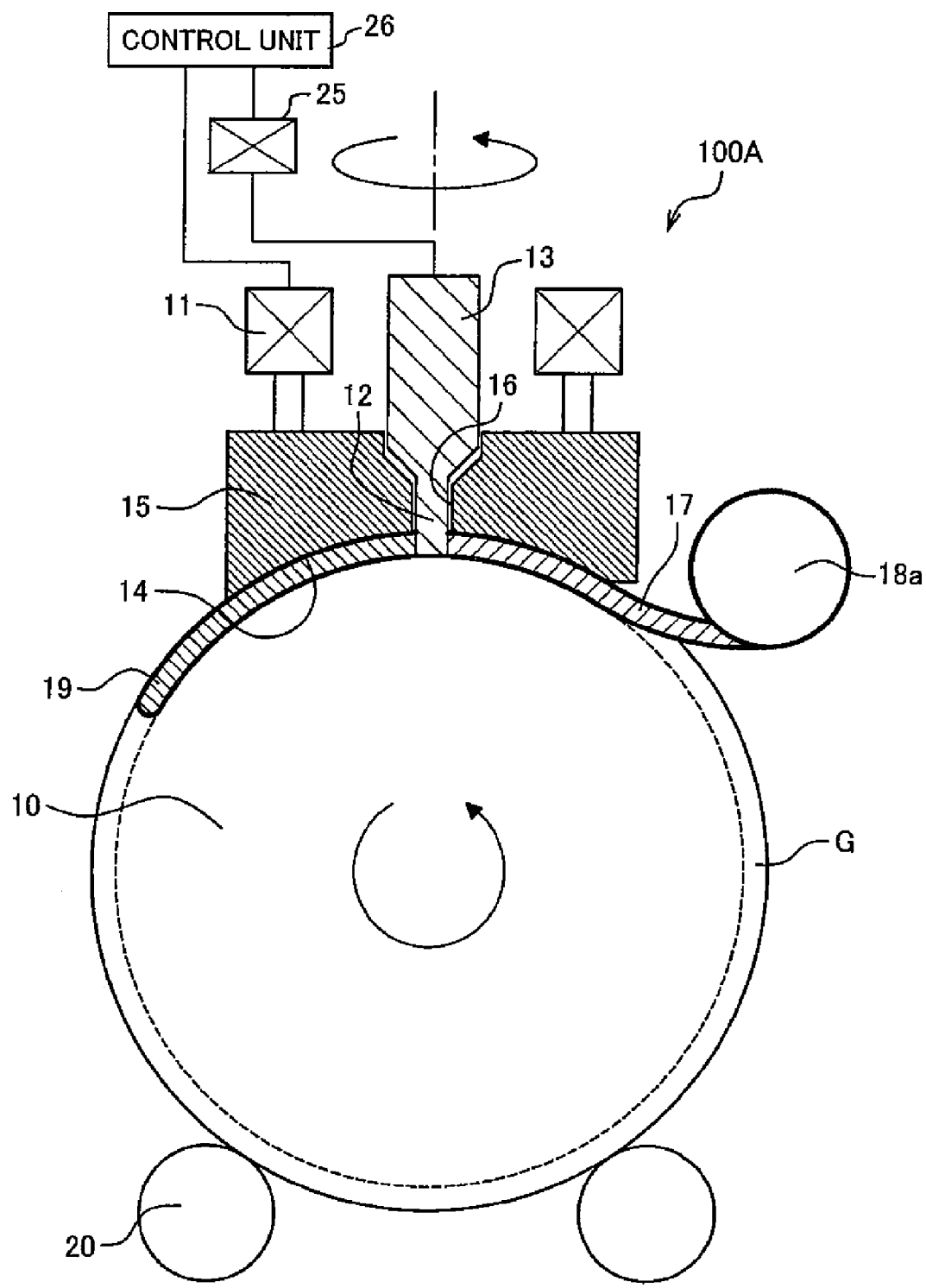
FIG. 1 is a sectional view schematically illustrating a structure of a friction stir processing apparatus in a first embodiment of the present invention.

Hereafter, detailed description will be given to embodiments of the present invention with reference to the drawings. Here, embodiments in which a curved surface of a columnar (cylindrical) work (that is, a cylindrical workpiece) is subjected to a friction stir processing will be taken as examples. However, the present invention is applicable to any work (that is, a workpiece) as long as a processed surface thereof to be subjected to the friction stir processing is a flat surface or a curved surface having a constant curvature. Examples of such a curved surface include an inner surface of a cylinder, an outer surface of the cylinder, an outer surface of a column, a spherical surface, a lens-like surface, and the like. The concept of friction stir processing includes joining processing and modification processing by the friction stir. Whether the processing is joining processing, modification processing, or modification and joining processing is determined on a case-by-case basis.

The friction stir processing apparatus of the present invention further includes a vibrator for applying mechanical vibration to the jig in a direction of pressing the jig, and a vibration control unit for actuating the vibrator when the tool is rotated by the rotating unit, the tip of the tool has been sunk into the work to the predetermined depth by the first pressing unit, and the tool and the jig are moved relative to the work.

The friction stir processing apparatus of the present invention further includes a material feeding unit for feeding powder, a wire or a sheet of a material different from that of the work to a position where the tip of the tool is sunk into the work when the tool and the jig are moved relative to the work.

The friction stir processing apparatus of the present invention further includes a material feeding unit for feeding powder, a wire or a sheet of a material different from that of the work from ahead in the moving direction of the tool to a position where the tip of the tool is sunk into the work when the tool and the jig are moved relative to the work.

In the above friction stir processing apparatus, the jig may include a port disposed in a position located ahead in a moving direction of the tool, and the material feeding unit may be configured to feed the powder or the wire through the port.

The jig may include a port for supplying gas to a space between the sliding surface of the jig and the work in a position located behind in a moving direction of the tool when the tool and the jig are moved relative to the work.

A coating (or a film) of any material selected from a group of hard carbon, diamond-like carbon, titanium nitride, and chromium nitride may be provided on the sliding surface of the jig against the work.

The sliding surface of the jig against the work may have an uneven pattern.

A friction stir processing includes steps of pressing a jig, slidable on a work, against the work while encircling a tip-side part of a tool having a columnar tip, pressing the tool against the work to sink the tip of the tool into the work while rotating the tool inserted into the jig, carrying out the friction stir processing on the work by the tip-side part of the tool by moving the tool and the jig relative to the work, and gradually pulling the tool out of the work while moving the tool and the jig relative to the work.

In the above friction stir processing, the jig may be applied with vibration in a direction that the jig is pressed against the work during a period when the tool is in contact with the work.

A friction stir processing includes steps of pressing a jig slidable on a work against the work and applying vibration to the jig in a direction that the jig is pressed against the work, rotating a tool having a columnar tip-side part and pressing a tip of the tool against the work to sink the tip of the tool into the work, and applying the vibration to the jig and moving the tool and the jig relative to the work to carry out the friction stir processing on the work by the tool.

First Embodiment

FIG. 1 is a sectional view schematically illustrating a structure of an apparatus for a friction stir in a first embodiment of the present invention. friction stir processing apparatus 100A is so structured that friction stir processing is carried out so that an arc is drawn along a curved circumferential surface of a columnar or cylindrical work 10. The work 10 is supported on backing rollers 20 and is rotated on a central axis by a motor (not shown) for a rotary table or the like. In the work 10, a ring-like groove G is formed and the friction stir processing apparatus 100A rotates the work 10 and carries out the friction stir processing along the groove G.

The friction stir processing apparatus 100A includes a tool 13 having a columnar tip-side part (hereafter, referred to as "pin") 12, a rotating and pressing unit 25 having the function of a rotating unit for rotating a tool 13 on the central axis and the function of a first pressing unit for pressing the pin 12 against the work 10, a jig (hereafter, referred to as "retaining jig") 15 having a tool insertion hole 16 into which the pin 12 of the tool 13 can be inserted, a pressing and vibrating unit 11 having a function of a second pressing unit for pressing the retaining jig 15 against the work 10 and a function of a vibrator for applying mechanical vibration to the retaining jig 15 in a direction of this pressing, a wire feeding unit 18a for feeding a wire 17 as a modification material (filler) to an area on a surface of the work 10 where the pin 12 is to be sunk, and a control unit 26 that controls the rotating and pressing unit 25 and the pressing and vibrating unit 11. The control unit 26 also controls driving of a rotary table (not shown) for rotating the work 10. The control unit 26 includes a press control unit and a vibration control unit.

Only a certain length of the tip of the pin 12 of the tool 13 is sunk into the work 10, and the pin 12 is sunk substantially to a depth of the groove G formed in the work 10. The tool 13 can be selected from a group of materials appropriate to a material and the like of the work 10 to be processed.

A sliding surface 14 of the retaining jig 15 brought into contact with the work 10 has the same curvature as a curvature of the curved circumferential surface of the work 10. The sliding surface 14 has a curved surface shape that compliments the curved circumferential surface of the work 10. Thus the retaining jig 15 can be pressed against the curved circumferential surface of the work 10 with uniform force.

When the work 10 is rotated, the retaining jig 15 is not rotated. However, since the retaining jig 15 is pressed against the work 10 by the pressing and vibrating unit 11, the retaining jig 15 is moved relatively with friction against the surface of the work 10. As a result, friction is caused on the sliding surface 14 in a dry environment without lubrication. When frictional force between the retaining jig 15 and the work 10 is large, large torque is required from a motor of a rotary table or the like for rotating the work 10. When the relative moving velocity between the retaining jig 15 and the work 10 lowers or intermittently changes, the following takes place: an outer circumferential surface of the tool 13 is brought into contact with an inner circumferential surface of the tool insertion hole 16 formed in the retaining jig 15. As a result, it is possible that high frictional heat will be produced or the tool 13 will be damaged. When the retaining jig 15 is constantly in friction with the surface of the work 10, it is possible that a defect, such as a scratch, will be produced on the surface of the work 10.

To cope with this, it is desirable that the sliding surface 14 of the retaining jig 15 be structured to reduce frictional force between the retaining jig 15 and the work 10. An example thereof will be described in detail later as a second embodiment. The pressing and vibrating unit 11 form one of unit for reducing friction between the retaining jig 15 and the work 10.

The tool insertion hole 16 formed in the retaining jig 15 encircles the circumference of the pin 12 and only the pin 12 can protrude from the tool insertion hole 16. When the tool 13 is rotated under normal conditions, the outer circumferential surface of the pin 12 or the inner circumferential surface of the tool insertion hole 16 do not slide on each other. It is possible to suppress the occurrence of local wear, to constantly sink the pin 12 into the work 10 to a certain depth, and to ensure a certain area to be processed by the friction stir by making an outside diameter of the pin 12 uniform.

If only the pin 12 is sunk into the work 10 without the retaining jig 15, it turns out that a unit for holding a substance, stirred by the pin 12, in the work 10 does not exist. (The above substance is a substance composing the work 10 and a substance composing the wire 17 fed by the wire feeding unit 18*a*.) As a result, the stirred substance will be discharged to the outside, and a groove-like defect is produced in the area of the work 10 processed by the friction stir as if cutting work were conducted. Consequently, the friction stir processing apparatus 100A in which only the pin 12 is sunk into the work 10 requires a unit for suppressing discharging of a substance stirred by the pin 12 to the outside and holding the substance in the work 10. The retaining jig 15 assumes this role.

For the pressing unit in the pressing and vibrating unit 11, a hydraulic cylinder or an air cylinder can be used. For the vibrator in the pressing and vibrating unit 11, a commonly used rotary vibrator or piston vibrator for vibrating a mechanical structural component can be used. There is no special limitation on oscillation frequency and, for example, a frequency of 20 Hz or so is sufficient. The reason for this is as follows: the rotational velocity of the tool 13 in a common friction stir processing is 1000 rpm (that is, 16 Hz); and the unit only has to vibrate once or so when one semicircular ripple mark, which occurs in a modified area as an area processed by the friction stir, illustrated in FIGS. 2A and 2B referred to later, is formed.

The wire feeding unit 18*a* houses a reeled wire 17 composed of a material (filler) for modification of the surface of the work 10. The unit sends out the wire 17 along the groove G formed in the work 10 and thereby feeds the wire 17 to a place where the pin 12 is sunk. The wire feeding unit 18*a* may feed a sheet in place of the wire 17. The wire 17 is softened together with the work 10 and as a result, the modified area 19 is formed. The area of the work 10 where the friction stir processing is to be carried out is arranged beforehand with the groove G. Therefore, the wire 17 is easily fitted into the groove G by the retaining jig 15 and is less prone to be discharged to the outside even when stirred by the pin 12. As a result, a utilization ratio of the wire 17 is enhanced. (The utilization ratio refers to the ratio of the amount of a wire taken into the modified area 19 to the amount supplied.)

For the wire 17, one made of a material suitable for modification by the friction stir processing is appropriately selected. When the groove G formed in the work 10 is filled and the structure is modified with the same material during the friction stir processing, a wire made of the same material as that of the work 10 can be used. The wire 17 may be filled beforehand in the groove G. In this case, the wire feeding unit 18*a* is unnecessary.

The control unit 26 controls the following: the rotational velocity of the tool 13; the depth of the pin 12 sunk into the work 10; force with which the retaining jig 15 is pressed against the work 10 by the pressing and vibrating unit 11; the way the retaining jig 15 is vibrated by the pressing and vibrating unit 11; the rotational velocity of the work 10; and the like.

(First Processing Mode)

In a first processing mode in which the work 10 is processed using the friction stir processing apparatus 100A, the following procedure is taken. First, the work 10 is supported on the backing rollers 20. The wire 17 from the wire feeding unit 18*a* is inserted to a place where the pin 12 is to be sunk along the groove G, and the retaining jig 15 is pressed against the work 10 with certain force. The tool 10 is rotated at constant velocity and is inserted into the tool insertion hole 16 and the pin 12 is pressed against the work 10 and sunk to a certain depth. The work 10 is rotated at constant velocity and the wire 17 is fed in time with this rotational velocity. As a result, the modified area 19 is gradually formed.

The work 10 is rotated 360° (one turn). As a result, the entire circumference of the work 10 undergoes the friction stir processing and the ring-shaped modified area 19 is formed. The present invention may be configured so that when the wire 17 is fed by the wire feeding unit 18*a* by a length equivalent to the length of the circumference of the groove G, the wire 17 is automatically cut. In the first processing mode, the pressing and vibrating unit 11 does not perform the operation of vibrating the retaining jig 15 while in this mode.

When the work 10 is rotated once and the starting point of the friction stir processing arrives at the position where the pin 12 is sunk, the pin 12 is gradually pulled out of the work 10 while the work 10 is continuously rotated. That is, an area where the friction stir processing overlaps is provided and the pin 12 is gradually pulled out of the work 10. For example, when the work 10 that has been already rotated once is further rotated by ¼ turn, the pin 12 is completely pulled out of the work 10. According to the friction stir processing in the first processing mode, it is possible to prevent a key hole from being produced on the surface of the modified area 19 in a place where the pin 12 was completely pulled out. "A period from before the tool is sunk into the work 10 until the tool is completely pulled out of the work 10" can be called "during a period when the tool is in contact with the work 10".

(Second Processing Mode)

In the second processing mode in which the work 10 is processed using the friction stir processing apparatus 100A, the following procedure is taken. First, the work 10 is supported on the backing rollers 20. The wire 17 from the wire feeding unit 18a is inserted to a place where the pin 12 is to be sunk along the groove G and the retaining jig 15 is pressed against the work 10 with certain force. At the same time, the operation of vibrating the retaining jig 15 by the pressing and vibrating unit 11 is started. The tool 13 is rotated at constant velocity and is inserted into the tool insertion hole 16 and the pin 12 is pressed against the work 10 and sunk to a certain depth. Thereafter, the work 10 is rotated at constant velocity while the retaining jig 15 is vibrated and the wire 17 is fed in time with this rotational velocity. As a result, the modified area 19 is gradually formed.

The work 10 is rotated once and the entire circumference of the work 10 undergoes the friction stir processing. Then the rotation of the work 10 is stopped and the pin 12 is pulled out of the work 10. The rotation of the tool 13 is stopped and the vibration of the retaining jig 15 is stopped.

Figure 2A:
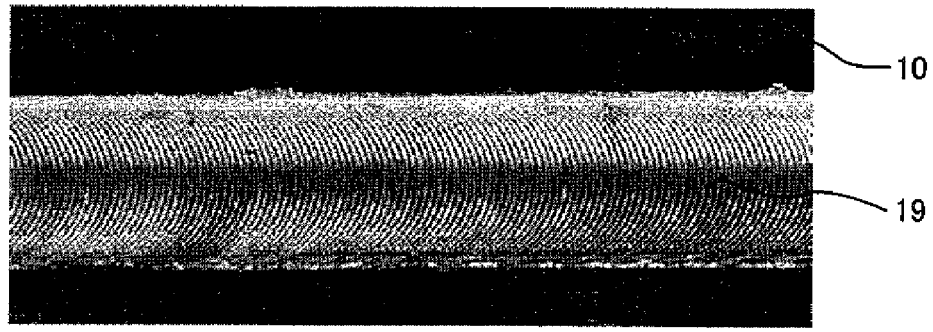
FIG. 2A is a photo of a surface of a modified area obtained by a second processing mode and an area in proximity thereto.
Figure 2B:
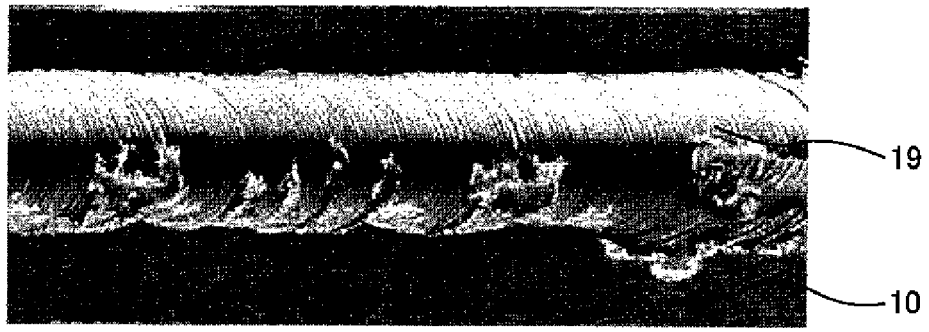
FIG. 2B is a photo of a surface of a modified area observed when an operation of applying mechanical vibration to a retaining jig is not performed and an area in proximity thereto.

FIG. 2A is a photo of a modified area obtained by this second processing mode and a surface in proximity thereto (with vibration). FIG. 2B is a photo of a modified area obtained when the operation of vibrating the retaining jig 15 is not performed at all and a surface in proximity thereto (without vibration). As illustrated in FIG. 2B, it was found that a defect was produced when the operation of vibrating the retaining jig 15 was not performed. The defect was probably caused by the rotational velocity of the work 10 being intermittently changed by friction between the sliding surface 14 of the retaining jig 15 and the surface of the work 10. As illustrated in FIG. 2A, meanwhile, it was found that the surface of the modified area 19 was smooth according to the friction stir processing method in the second processing mode. This is probably because the frictional force between the retaining jig 15 and the work 10 is reduced by vibrating the retaining jig 15.

(Third Processing Mode)

A third processing mode has both a feature of the first processing mode and a feature of the second processing mode. In the first processing mode, the work 10 is rotated to provide an overlap area and the pin 12 is gradually pulled out of the work 10. In the second processing mode, the retaining jig 15 is vibrated at least while the friction stir processing is being carried out. As a result, it is possible to suppress an occurrence of a key hole and smooth a finished surface of the modified area 19.

Second Embodiment

Figure 3A:
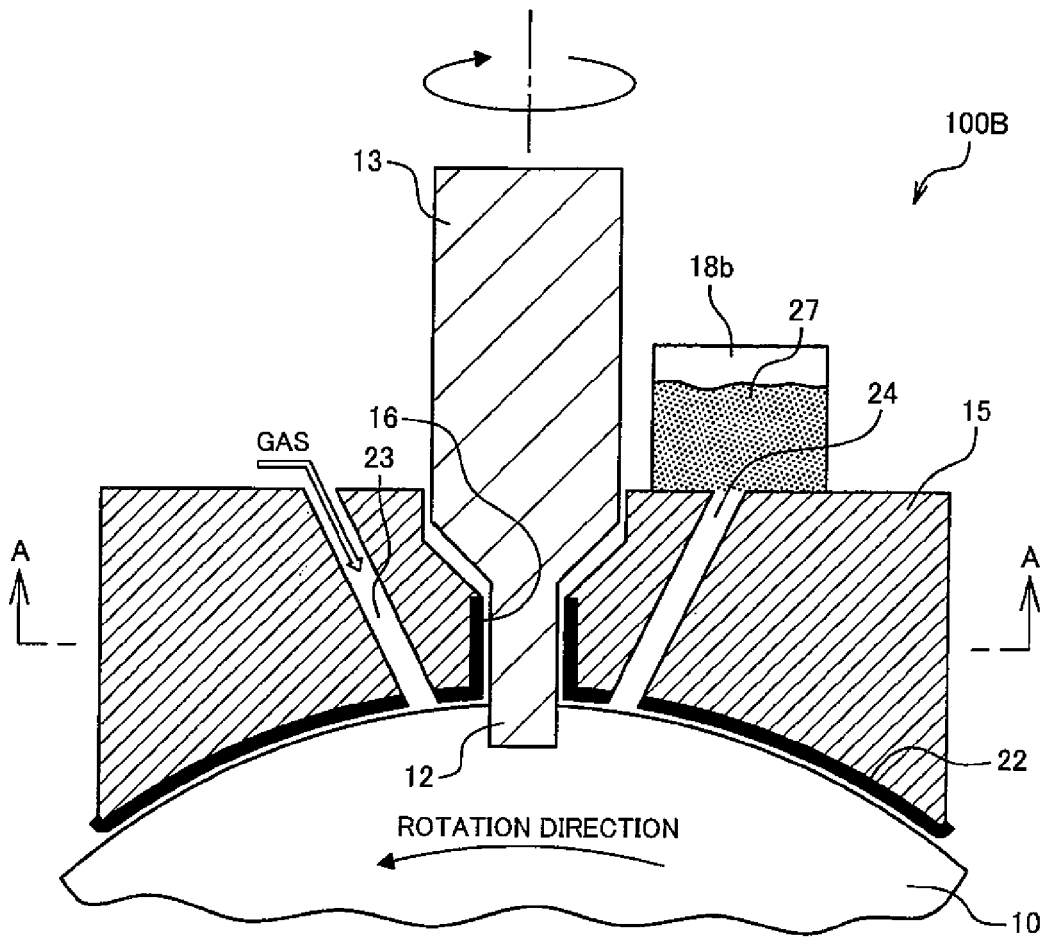
FIG. 3A is a sectional view schematically illustrating a structure of a friction stir processing apparatus in a second embodiment of the present invention.
Figure 3B:
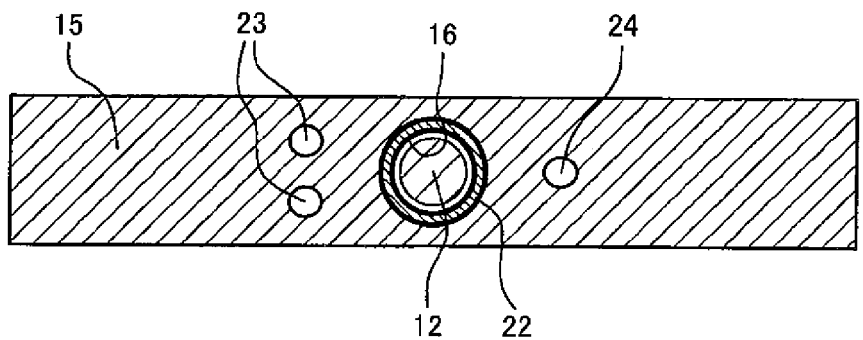
FIG. 3B is a sectional view taken along line A-A of FIG. 3A.
Figure 11:
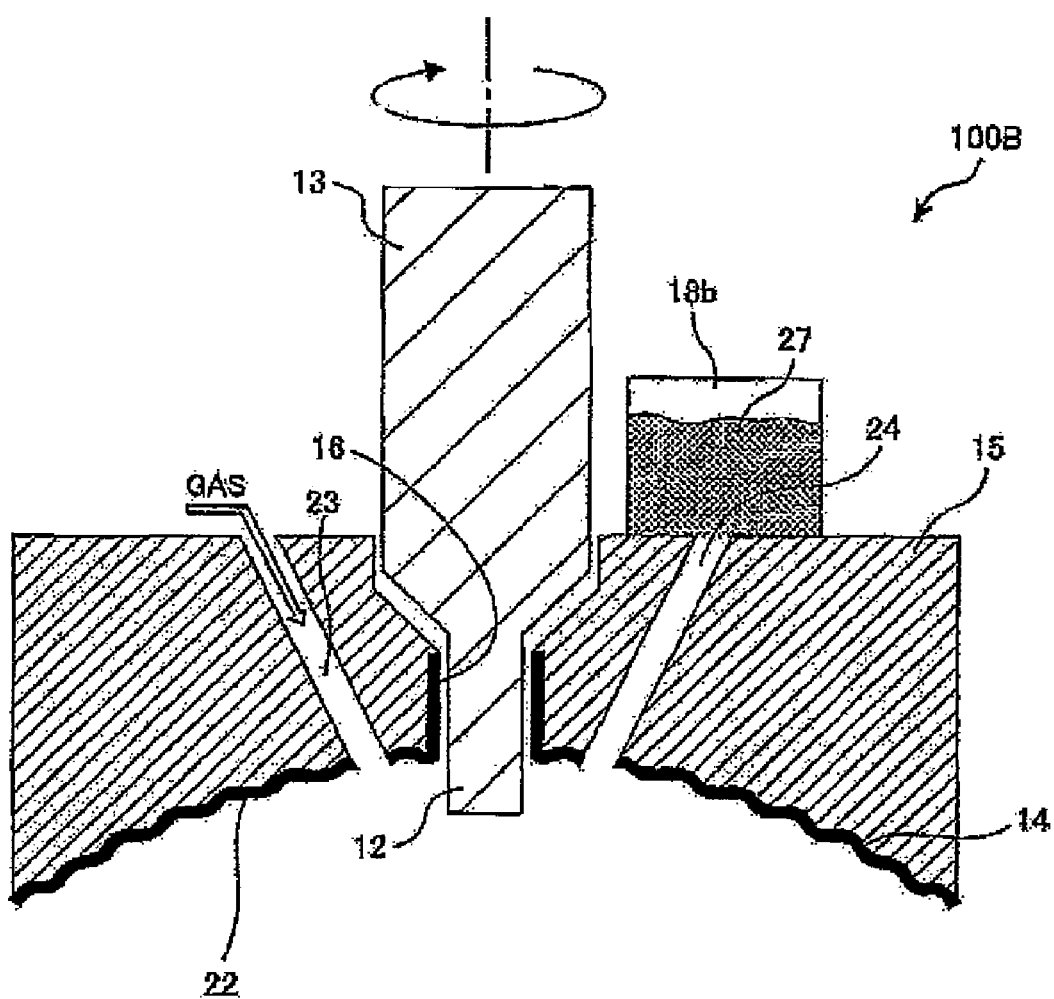
FIG. 11 is a sectional view schematically illustrating a structure of a friction stir processing apparatus of the present invention wherein the sliding surface of the jig has an uneven pattern.

FIG. 3A is a sectional view schematically illustrating a structure of a second embodiment of a friction stir processing apparatus 100B for and FIG. 3B is a sectional view taken along line A-A of FIG. 3A. FIG. 11 is a sectional view of the friction stir processing apparatus 100B, illustrating a hard film 22 is formed on the sliding surface of the retaining jig 15 for suppressing wear caused by friction with the work 10.

Examples of the material favorably used for the hard film 22 include diamond-like carbon, titanium nitride, chromium nitride, and the like, though not limited to these materials. Any material can be used for the hard film 22 as long as the Vickers hardness Hv of the material is not less than approximately 1000. It is desirable that a coefficient of friction of the hard film 22 should be low and the coefficient of friction of not more than 0.1 is more desirable.

It is desirable that a pattern of convexes and concaves, such as dimples or grooves, should be formed on the sliding surface of the retaining jig 15. FIG. 11 illustrates that the pattern of convexes and concaves can be called an uneven pattern or a pattern of small convexes and concaves. This makes it possible to further reduce the frictional force between the retaining jig 15 and the work 10. Even when the hard film 22 is not formed on the sliding surface of the retaining jig 15, the frictional force between the retaining jig 15 and the work 10 can be reduced by providing the sliding surface with the pattern of convexes and concaves.

In the friction stir processing apparatus 100B gas supply ports 23 are formed in the retaining jig 15 and, for example, air, argon, nitrogen gas, or the like can be supplied to between the sliding surface of the retaining jig 15 and the work 10. Such gas acts as a lubricant and the frictional force between the retaining jig 15 and the work 10 is thereby reduced. At this time, use of inert gas makes it possible to prevent oxidation in the work 10 and the sliding surface of the retaining jig 15. When the pattern of convexes and concaves is formed on the sliding surface of the retaining jig 15 as mentioned above, this pattern functions to ensure a gas flow path and more favorable slidability can be obtained.

In the retaining jig 15, there is formed a powder supply port 24 is formed. The powder supply port 24 is used to supply powder 27, used as filler for modifying the surface of the work 10 by the friction stir processing, to a place where the pin 12 is sunk. The powder supply port 24 has a powder feeding unit 18b attached to an upper end thereof. Since a lower end of the powder supply port 24 can be provided in proximity to a place where the pin 12 is sunk, it is possible to reduce scattered and lost powder and enhance the ratio of utilization of the powder. When the retaining jig 15 is vibrated, the powder 27 is reliably supplied to between the sliding surface of the retaining jig 15 and the work 10 by this vibration. Therefore, the surface of the work 10 can be evenly modified. When the groove G (not shown in FIG. 3A) is formed in the work 10 as mentioned above, the ratio of the powder 27 filled in the groove G is increased and the ratio of utilization of the powder is enhanced.

The apparatus friction stir 100B is so configured that the powder 27 is supplied to a place where the pin 12 is sunk through the powder supply port 24. For this reason, the gas supply ports 23 and the powder supply port 24 are provided in opposite positions with the tool insertion hole 16 in-between. This is intended to suppress the powder 27 from being scattered by gas supplied between the sliding surface of the retaining jig 15 and the work 10 through the gas supply ports 23. When the surface of the work 10 is modified using a wire 17 (or a sheet), not the powder 27, a gas supply port 23 can also be provided in the position where the powder supply port 24 is otherwise provided.

Third Embodiment

Figure 4:
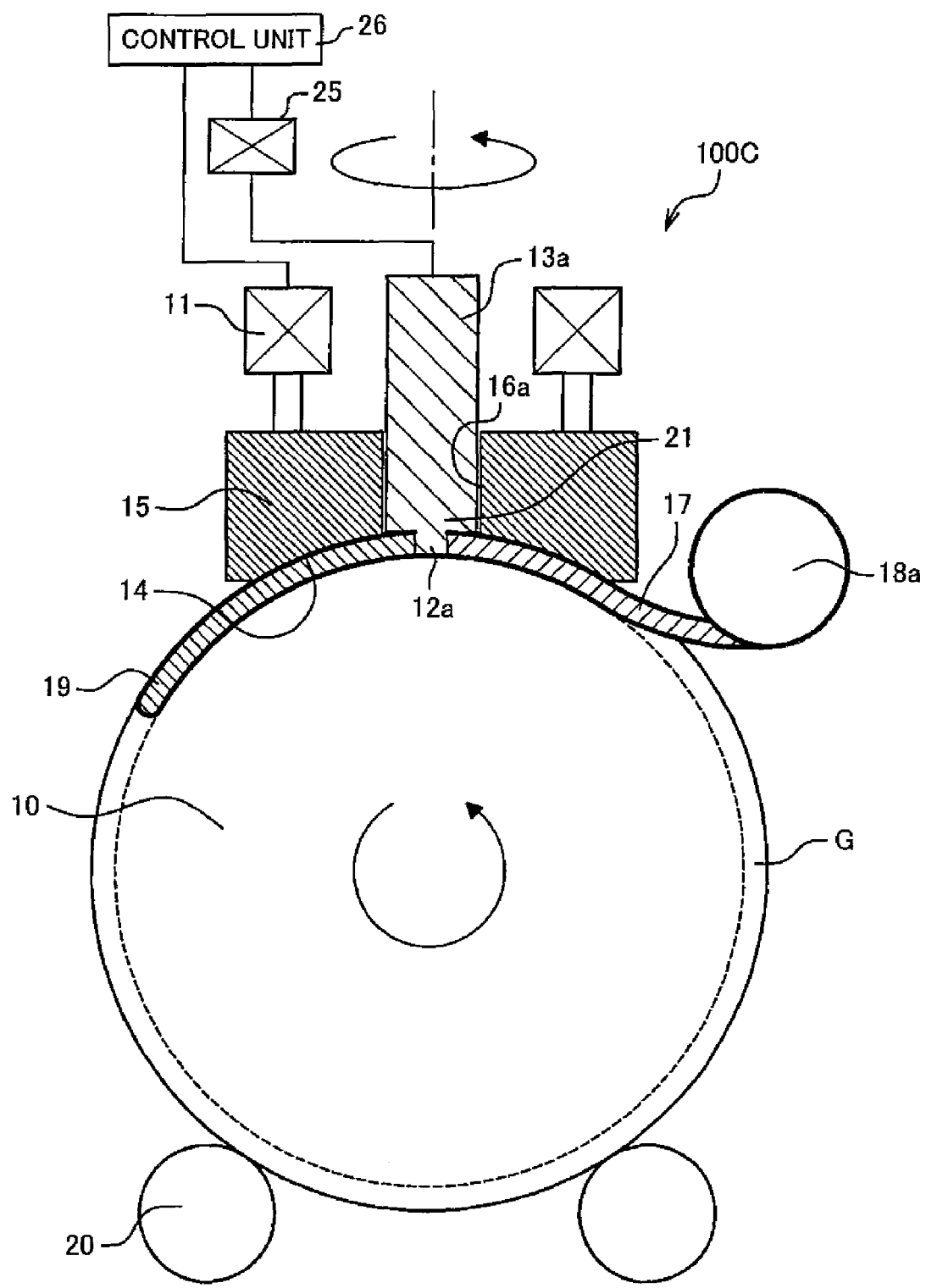
FIG. 4 is a sectional view schematically illustrating a structure of a friction stir processing apparatus in a third embodiment of the present invention.

FIG. 4 is a sectional view schematically illustrating a third embodiment of a friction stir processing apparatus 100C. This friction stir processing apparatus 100C is different from the above-mentioned friction stir processing apparatus 100A in that: a conventionally commonly used tool 13a is used in place of the tool 13, and a straight pipe-like tool insertion hole 16a is formed in the retaining jig 15 for inserting this tool 13a. The conventionally used tool is so structured that a columnar shoulder 21 is provided with a short columnar pin 12a smaller in a diameter than and coaxially with the shoulder 21.

When the friction stir processing in the above-mentioned first to third processing modes of the first embodiment is carried out using the tool 13a, the following usually takes place when the tool 13a is pulled out of the work 10: the shoulder 21 gets away from the work 10 first, and a key hole is produced. For this reason, the friction stir processing apparatus 100C is used for applications in which the production of a key hole is permitted. Also, friction stir processing with the friction stir processing apparatus 100C, by vibrating the retaining jig 15, forms the modified area 19 having a smooth surface, and the wire 17 as filler can be reliably supplied to a place where the pin 12a is sunk. For this reason, it is possible to enhance the ratio of utilization of the wire 17 and form a homogeneous modified area 19.

In the above-mentioned friction stir processing apparatuses 100A to 100C, a wire 17 or powder 27 as filler is supplied to the groove G formed in the work 10, and the area where the groove G is formed is modified. The friction stir processing with the friction stir processing apparatuses 100A to 100C is not limited to the above-mentioned modification processing and can also be used for the friction stir joining. A joint can be formed with a smooth surface and the production of a key hole suppressed.

The above-mentioned friction stir processing apparatuses 100A to 100C are so configured that the work 10 is rotated. Instead, the work 10 may be subjected to the friction stir processing by moving the tool 13, 13a and the retaining jig 15 to the work 10 fixed. An example will be taken. When the work 10 is a large plate-like body, and such large plate-like bodies are joined together or subjected to a surface modification, such a configuration that the plate-like bodies are moved requires a large processing space. When the tool and the retaining jig are moved integrally, it is possible to process the large plate-like bodies by the friction stir in a narrower processing space and to construct a compact friction stir processing apparatus.

More detailed description will be given to the present invention based on examples. Here, modification processing and joining processing of a work using the friction stir processing apparatus 100B will be taken as examples. A piston, a motor housing, and a vacuum vessel formed of aluminum alloy will be taken as examples of the work; however, the work is not limited to these examples.

Example 1

Figure 5:
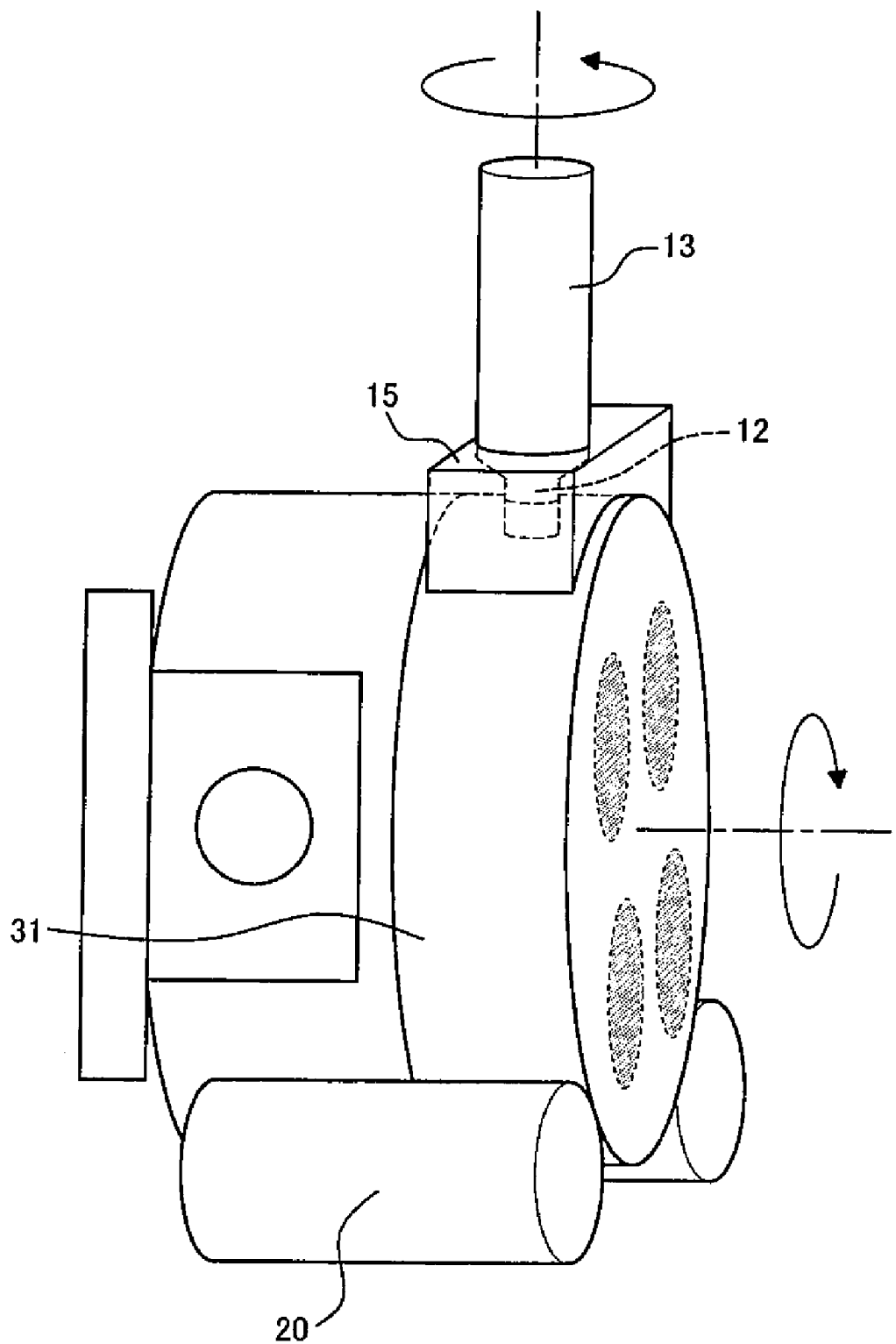
FIG. 5 is a perspective view schematically illustrating a mode of a friction stir processing in Example 1.

FIG. 5 schematically illustrates a mode for a friction stir processing in Example 1. A piston 31 as the work is supported on the backing rollers 20 and the piston 31 is rotated by the rotary table (not shown). The piston 31 is a heat treated cast aluminum alloy that is 100 mm in diameter and 80 mm in length. The tool 13 used here is made of tool steel and the diameter of the pin 12 is 8 mm and a thread pattern (not shown) is formed on the surface of the pin 12. The retaining jig 15 is made of cemented carbide and the sliding surface thereof is a curved surface with a curvature radius R of 50 mm and coated with diamond-like carbon.

In the friction stir processing described here, first, the retaining jig 15 was pressed against a side face of the piston 31 with a load of 200N by the pressing and vibrating unit 11 (not shown) and was periodically vibrated with a frequency of 20 Hz. Subsequently, the tool 13 was rotated at a rotational velocity of 1200 rpm by the rotating and pressing unit 25 (not shown) and the pin 12 was inserted into the piston 31 by 5 mm. Then the piston 31 was rotated at a rotational velocity of 1 rpm in the direction of the arrow in FIG. 5. (Refer to FIG. 5.) After the piston 31 was rotated 360° (one turn), the tool was pulled out of the piston 31 at a velocity of 60 mm/min with the rotational velocity of the piston 31 maintained. After the drawn tool 13 completely got away from the piston 31, the rotation of the piston 31 was stopped and pressing and vibrating by the retaining jig 15 were ceased, to terminate the friction stir processing.

Figure 6:
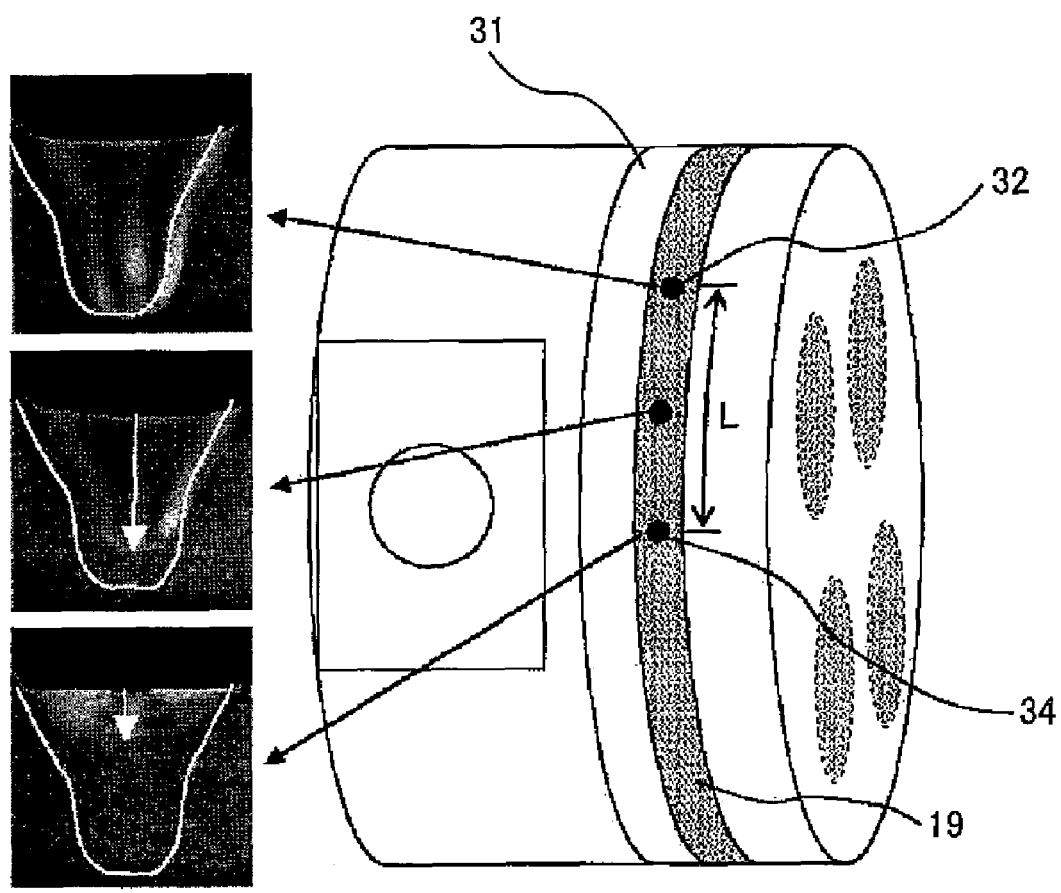
FIG. 6 is a perspective view schematically indicating positions of structure observation in a piston and photos of modified areas of the piston.

After the termination of the friction stir processing, the piston 31 was cut and the structure of the formed modified area was observed. FIG. 6 is a perspective view schematically indicating positions of structure observation in a piston and photos of modified areas of the piston. Reference code "L" found in FIG. 6 indicates an overlap area from a starting point 32 at which pullout of the pin 12 was started to an end point 34 at which pullout of the pin 12 was completed. The following was found: the modified area 19 was formed on the entire circumference of the piston 31; the pin had been pulled out while it was in the overlap area L extended through an angle of 30° from the starting point 32; and at the end point 34, a production of a key hole was suppressed as shown in the observation photo.

The casting surface of another piston 31 similarly processed was ground to form a ring groove, approximately 1 mm in width, in the modified area 19 and alumite treatment was carried out. As a result, an alumite layer (oxide layer) having a uniform thickness was formed. The smoothness (surface roughness) of the alumite layer formed by this alumite treatment was lower by approximately an order of magnitude than conventional.

Example 2

Figure 7:
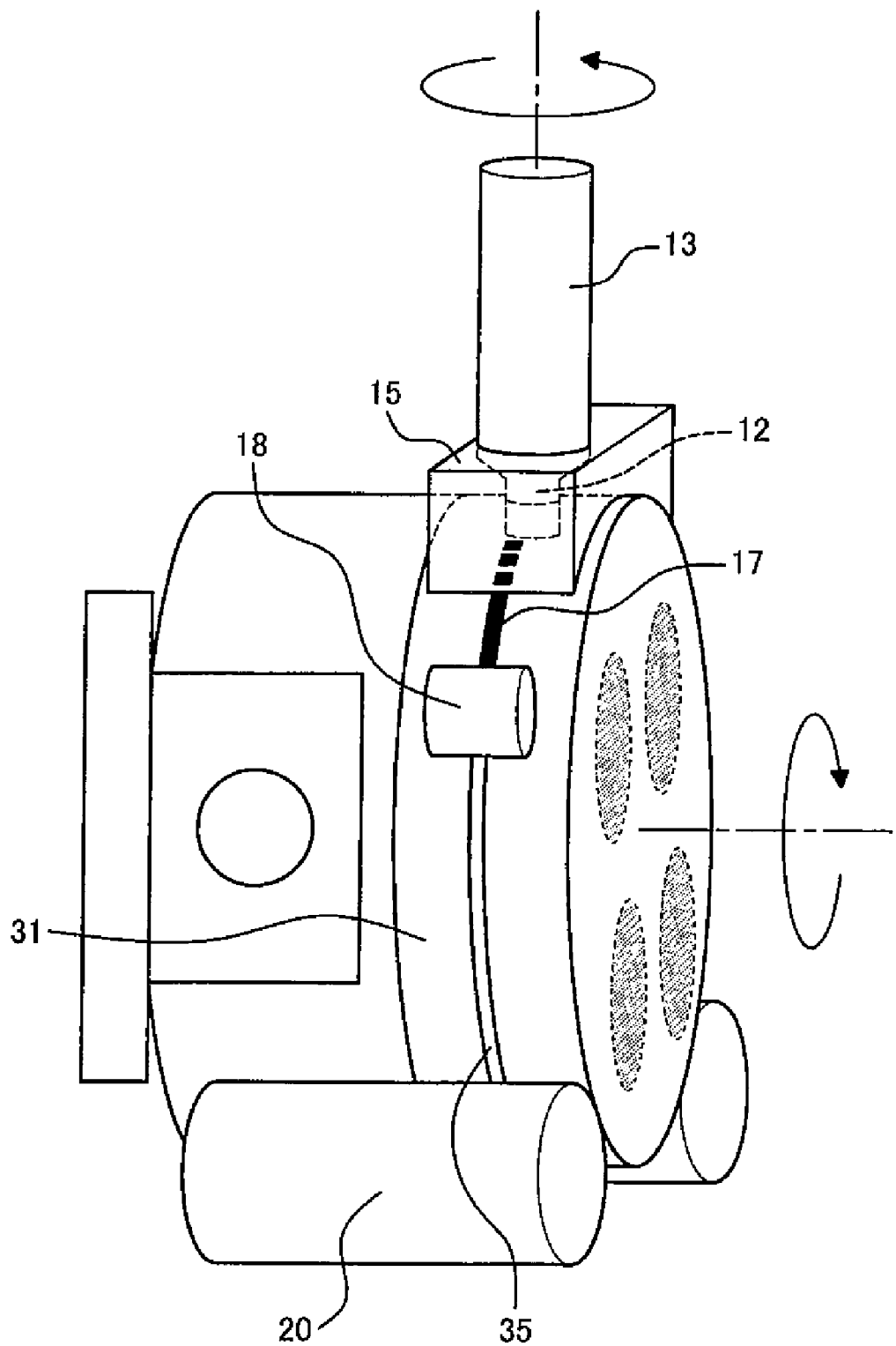
FIG. 7 is a perspective view schematically illustrating a mode of a friction stir processing in Example 2.

FIG. 7 schematically illustrates a mode for a friction stir processing in Example 2. The friction stir processing was carried out on a piston 31 having a groove 35, 2 mm in width and 5 mm in depth, formed beforehand. The dimensions of the piston 31 and the specifications of the tool 13 and the retaining jig 15 were the same as in Example 1. In Example 2, alumina powder as filler was supplied to the groove 35 through the powder supply port 24 (not shown) and the surface of the piston 31 was modified along the groove 35. To uniformly disperse the alumina powder, the number of rotations of the tool 13 was set to 1800 rpm and the rotational velocity of the piston 31 was set to 0.8 rpm. After the completion of friction stir processing, the weight of alumina powder supplied from the powder supply port 24 and the weight of alumina powder not taken into the groove 35 and discharged to the outside were measured. The measurement confirmed that the alumina powder had been effectively used in modification with a high utilization ratio of approximately 90%. The casting surface of the piston 31 was ground to form a ring groove, approximately 1 mm in width and alumite treatment was carried out. The wear resistance of the ring groove in the thus fabricated piston was higher by several times than in conventional cases.

Example 3

Figure 8A:
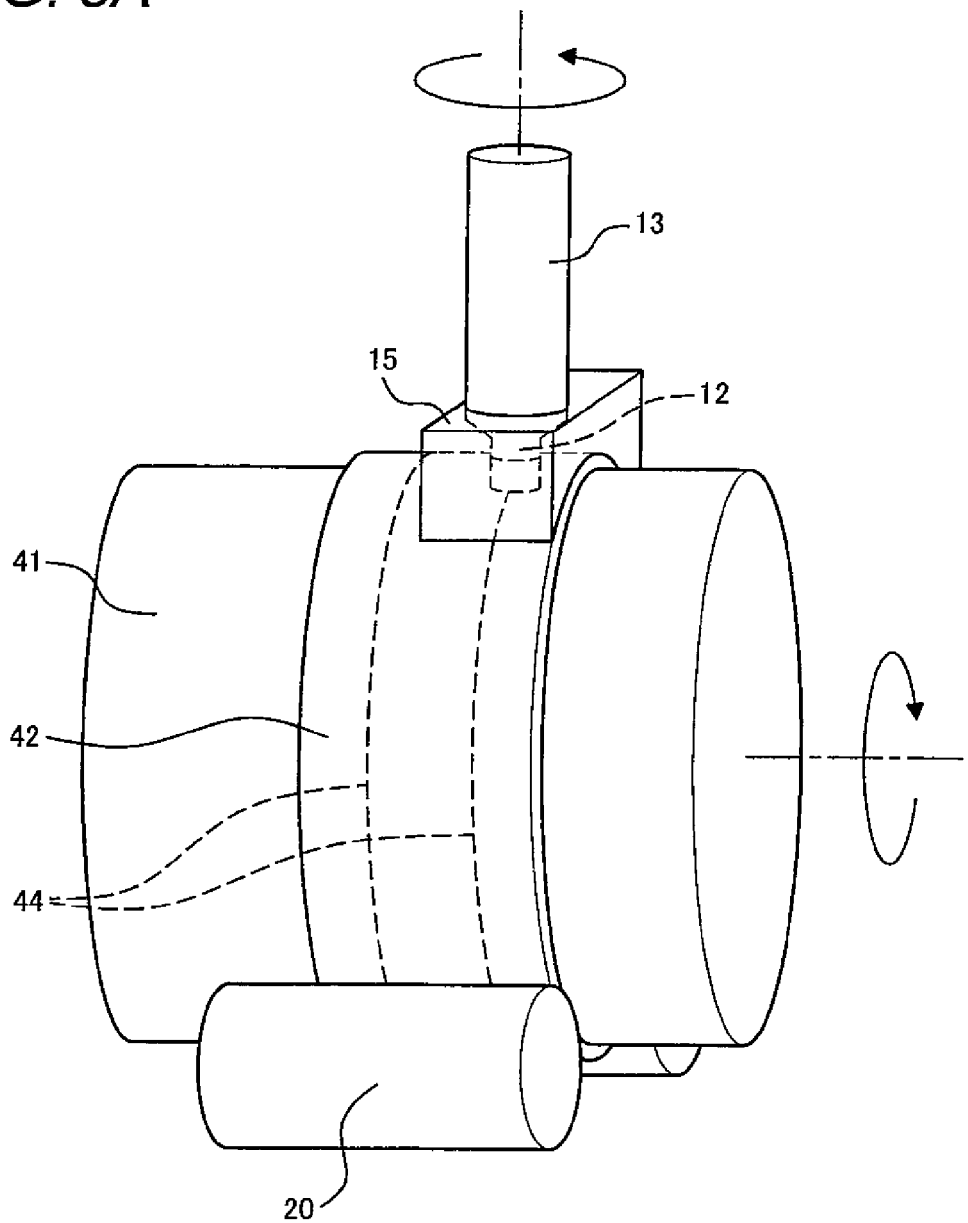
FIG. 8A is a perspective view schematically illustrating a mode of a friction stir processing in Example 3.
Figure 8B:
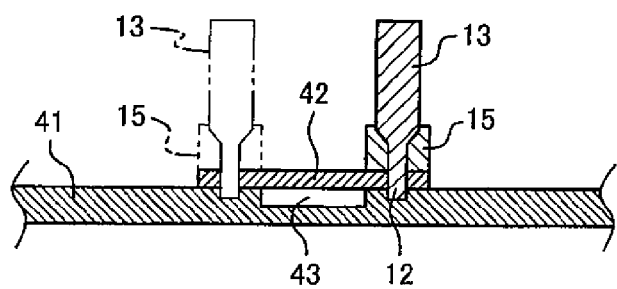
FIG. 8B is a sectional view schematically illustrating a mode for pressing a jig and a tool for retaining against a cover.

FIG. 8A schematically illustrates a mode for a friction stir processing in Example 3 and FIG. 8B schematically illustrates a mode for pressing a retaining jig and a tool against a cover. The cover 42 was lap joined with a motor housing 41 having a cooling path 43 formed therein beforehand by the friction stir. The motor is an electric motor, a generator, or the like and has a water cooling unit therein to cope with a recent trend to power enhancement and size reduction.

The motor housing 41 is supported on the backing rollers 20 and is rotated by the rotary table, not shown. The motor housing 41 is a heat treated aluminum alloy cast, 130 mm in a diameter and 180 mm in a length. The cover 42 is a cylindrical aluminum material 2 mm in a wall thickness and is fit onto and lap joined with the motor housing 41. The cooling path 43 is thereby formed. The tool 13 used here is made of tool steel and the pin 12 is 6 mm in diameter and 3 mm in length. A thread pattern (not shown) is formed on the surface of the pin 12. The retaining jig 15 is made of cemented carbide and the sliding surface thereof is a curved surface with a curvature radius R of 65 mm. The sliding surface is provided with a dimple pattern and coated with a diamond-like carbon film.

The lap joining of the cover 42 is carried out along the join lines 44 indicated in FIG. 8A. The join lines 44 indicated in FIG. 8A represent the routes followed by the pin 12 and after the friction stir joining, the trace of the joint appears along the join lines 44. In FIG. 8B, the retaining jig 15 and the tool 13 are depicted in parallel in two places. The friction stir joining is carried out by the retaining jig 15 and tool 13, depicted by solid line, and then the friction stir joining is carried out by the retaining jig 15 and tool 13, depicted by virtual line (alternate long and two short dashes line).

In the friction stir joining described here, first, the retaining jig 15 was pressed against the side face of the motor housing 41 with a load of 100N by the pressing and vibrating unit 11 (not shown) and was periodically vibrated with a frequency of 20 Hz. Subsequently, the tool 13 was rotated at a rotational velocity of 2500 rpm by the rotating and pressing unit 25 (not shown) and the pin 12 was caused to penetrate the cover 42 and was inserted into the motor housing 41 by 3 mm. Then the motor housing 41 was rotated at a rotational velocity of 1 rpm in the direction of the arrow. (Refer to FIG. 8A.) After the motor housing 41 was rotated 360°, the tool 13 was pulled out at a velocity of 60 mm/min with the rotational velocity of the motor housing 41 maintained. After the tool 13 completely got away from the cover 42, the rotation of the motor housing 41 was stopped and pressing and vibrating by the retaining jig 15 were ceased to terminate the friction stir joining processing. This friction stir joining processing is carried out with respect to each of the two join lines 44.

A key hole does not occur at a joint thus formed by the friction stir joining. Therefore, a motor housing 41 highly reliable in the prevention of the leakage of cooling water from the cooling path 43 is obtained. As mentioned above, the friction stir processing of the present invention is favorably used not only to modify the surface of a member. The friction stir processing is also used to form a favorable joint with the occurrence of a key hole suppressed in lap joining, butt joining, and the like of members.

Example 4

Figure 9:
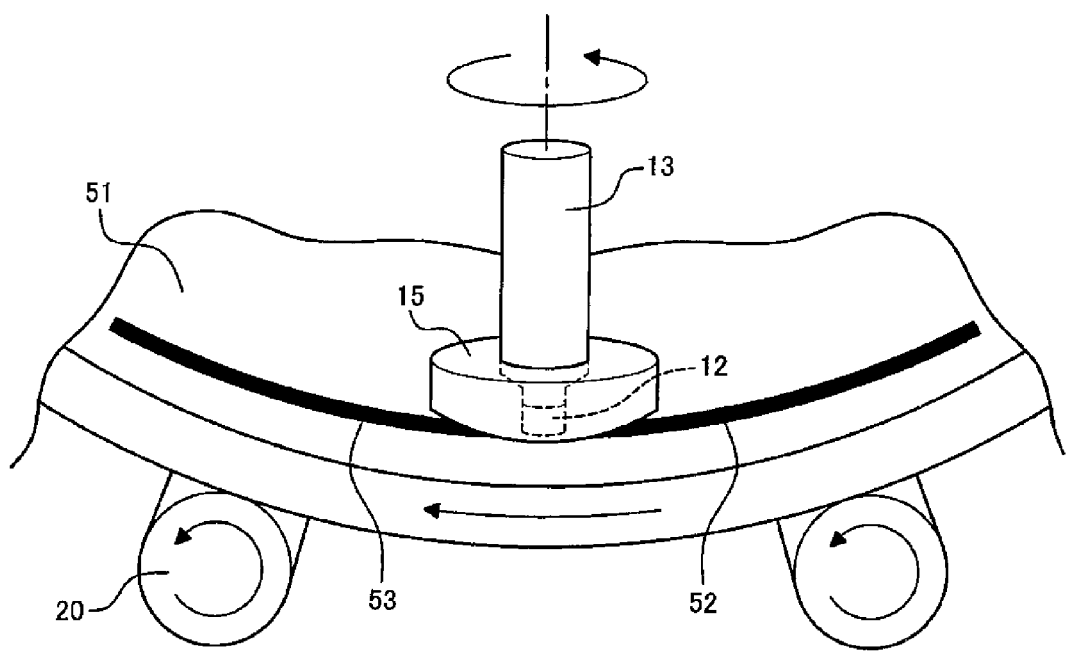
FIG. 9 is a drawing schematically illustrating a mode of a friction stir processing in Example 4.

FIG. 9 is a perspective view schematically illustrating a mode for a friction stir processing in Example 4. In this example, a surface of an arc welding area 52 of a vacuum vessel 51 formed of aluminum was modified. In general, the vacuum vessels 51 are fabricated by arc-welding aluminum, but in the arc welding areas 52, there is a possibility that a blowhole occurs, and this can lead to leakage in a vacuum vessel 51. Consequently, Example 4 was intended to form a modified area 53 free from a blowhole and having a homogeneous modified structure by the friction stir.

The vacuum vessel 51 is a cylinder 800 mm in diameter, 600 mm in length, and 20 mm in thickness. The vacuum vessel 51 has an arc welding area 52 formed by the arc welding. First, a portion built up by the arc welding is removed by machining to smooth the arc welding area. This vacuum vessel 51 is placed on the backing rollers 20 so that the vessel can be rotated by the rotary table, not shown. The tool 13 used here is made of tool steel and the diameter of the pin 12 is 8 mm and a thread pattern (not shown) is formed on the surface of the pin 12. The retaining jig 15 is made of cemented carbide and the sliding surface thereof is a convex curved surface with a curvature radius R of 500 mm so that the surface slides against the inner circumferential surface of the vacuum vessel 51. The sliding surface is coated with a diamond-like carbon film.

In the surface modification by the friction stir described here, first, the retaining jig 15 was pressed against an inner surface of the vacuum vessel 51 with a load of 200N by the pressing and vibrating unit 11 (not shown). (The present invention may be so configured that reaction force produced at this time is received by an opposite inner surface of the vacuum vessel 51.) The retaining jig was periodically vibrated at a frequency of 20 Hz. Subsequently, the tool 13 was rotated at a rotational velocity of 1500 rpm by the rotating and pressing unit 25 (not shown) and the pin 12 was inserted into the vacuum vessel 51 by 5 mm. Then the vacuum vessel 51 was rotated at a rotational velocity of 0.1 rpm to form a modified area 53. (Refer to FIG. 9.) After the vacuum vessel 51 was rotated 360°, the tool 13 was pulled out at a velocity of 60 mm/min with the rotational velocity of the vacuum vessel 51 was maintained. After the tool 13 completely got away from the vacuum vessel 51, the rotation of the vacuum vessel 51 was stopped and pressing and vibrating by the retaining jig 15 were ceased to terminate the surface modification by the friction stir.

Figure 10A:
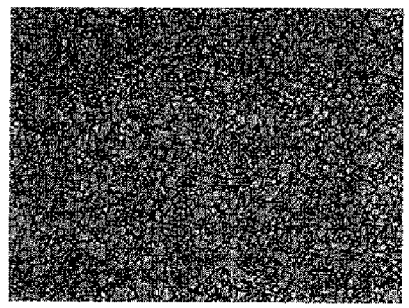
FIG. 10A is a photo of a microstructure of an arc welding area in a vacuum vessel before modification.
Figure 10B:
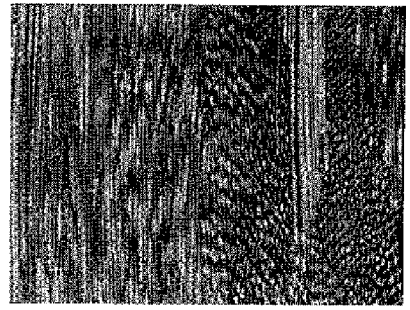
FIG. 10B is a photo of a microstructure of the arc welding area in the vacuum vessel after modification.

FIG. 10A is a photo of a microstructure of an arc weld in a vacuum vessel before modification and FIG. 10B is a photo of a microstructure after modification. As shown in FIG. 10B, an inhomogeneous structure containing a dendrite structure was observed in the arc welding area. In the modified area 53, as shown in FIG. 10A, a structure composed of an equiaxial crystal was formed and no blow hole was observed.

What is claimed is:

1. A friction stir processing apparatus comprising:
   a tool having a columnar tip-side part;
   a rotating unit configured to rotate the tool on a central axis;
   a first pressing unit configured to press a tip of the tool rotated by the rotating unit against a work;
   a jig having a tool insertion hole into which the tip-side part of the tool is inserted so that the tip-side part of the tool is encircled around the jig;
   a second pressing unit configured to slidably press the jig against the work;
   a press control unit configured to control the first pressing unit so that the tip-side part of the tool is gradually pulled out of the work by the first pressing unit while moving the tool and the jig relative to the work, in a state that the tool is rotated by the rotating unit and the tip of the tool has been sunk into the work to a predetermined depth by the first pressing unit;
   a vibrator configured to apply mechanical vibration to the jig in a direction of pressing the jig, wherein the vibrator has an oscillating frequency of about 20 Hz; and
   a vibration control unit configured to actuate the vibrator when the tool is rotated by the rotating unit, the tip of the tool has been sunk into the work to the predetermined depth by the first pressing unit, and the tool and the jig are moved relative to the work.

2. The friction stir processing apparatus according to claim 1, further comprising:
 a material feeding unit configured to feed powder, a wire or a sheet as a material different from that of the work to a position where the tip of the tool is sunk into the work when the tool and the jig are moved relative to the work.

3. The friction stir processing apparatus according to claim 2,
 wherein the jig includes a port disposed in a position located ahead in a moving direction of the tool, and
 wherein the material feeding unit is configured to feed the powder or the wire through the port.

4. The friction stir processing apparatus according to claim 1, wherein the jig includes a port configured to supply gas to a space between a sliding surface of the jig and the work in a position located behind in a moving direction of the tool when the tool and the jig are moved relative to the work.

5. The friction stir processing apparatus according to claim 1, wherein a coating of any material selected from a group of hard carbon, diamond-like carbon, titanium nitride, and chromium nitride is provided on a sliding surface of the jig against the work.

6. The friction stir processing apparatus according to claim 1, wherein a sliding surface of the jig against the work has an uneven pattern.

7. The friction stir processing apparatus according to claim 1, wherein the vibration control unit is configured to control the vibrator to reduce friction between the jig and the work.

8. The friction stir processing apparatus according to claim 7, wherein the vibrator is configured to vibrate about once per a formation of a semicircular ripple mark on an area of the work processed by the friction stir processing apparatus.

9. A friction stir processing apparatus comprising:
 a tool having a columnar tip-side part;
 a rotating unit configured to rotate the tool on the central axis;
 a first pressing unit configured to press a tip of the tool against a work;
 a jig configured to retain the work;
 a second pressing unit configured to slidably press the jig against the work;
 a vibrator configured to apply mechanical vibration to the jig in a direction of pressing the jig, wherein the vibrator has an oscillating frequency of about 20 Hz; and
 a vibration control unit configured to actuate the vibrator at least when the tool is rotated by the rotating unit, the tip of the tool has been sunk into the work to the predetermined depth by the first pressing unit, and the tool and the jig and the work are moved relative to the work.

10. The friction stir processing apparatus according to claim 9, further comprising:
 a material feeding unit configured to feed powder, a wire or a sheet as a material different from that of the work to a position where the tip of the tool is sunk into the work when the tool and the jig are moved relative to the work.

11. The friction stir processing apparatus according to claim 10,
 wherein the jig includes a port disposed in a position located ahead in a moving direction of the tool, and
 wherein the material feeding unit is configured to feed the powder or the wire through the port.

12. The friction stir processing apparatus according to claim 9,
 wherein the jig includes a gas supply port configured to supply gas to a space between a sliding surface of the jig and the work in a position located behind in a moving direction of the tool when the tool and the jig are moved relative to the work.

13. The friction stir processing apparatus according to claim 9,
 wherein a coating of any material selected from a group of hard carbon, diamond-like carbon, titanium nitride, and chromium nitride is provided on a sliding surface of the jig against the work.

14. The friction stir processing apparatus according to claim 9,
 wherein a sliding surface of the jig against the work has an uneven pattern.

15. The friction stir processing apparatus according to claim 9, wherein the vibration control unit is configured to control the vibrator to reduce friction between the jig and the work.

16. The friction stir processing apparatus according to claim 15, wherein the vibrator is configured to vibrate about once per a formation of a semicircular ripple mark on an area of the work processed by the friction stir processing apparatus.

* * * * *